Patented Jan. 3, 1950

2,493,694

UNITED STATES PATENT OFFICE 2,493,694

MICA PRODUCT AND METHOD OF MAKING THE SAME

Randall Huron Shepard, Valparaiso, Ind., assignor to Continental-Diamond Fibre Company, Newark, Del., a corporation of Delaware No Drawing. Application April 4, 1946, Serial No. 659,671

20 Claims. (Cl. 154—2.6)

The present invention relates to novel mica products of advantageous properties and to methods of making the same, and more particularly it relates to composite products comprising mica splittings held together by inorganic binder material and characterized by desirable properties including unusual resistance to heat and moisture. The invention is specially directed to the production of laminated products comprising superposed layers of mica splittings, the mica splittings and the superposed layers being held together by inorganic binding material characterized by desirable properties.

Heretofore, various inorganic binding materials have been suggested for use in the production of built-up mica plate from mica splittings but none of the materials used or suggested for use provides a mica plate which possesses all of the desired properties. For example, the use of sodium silicate, either alone or in combination with a material such as an alkali hydroxide or carbonate which provides a binder with a relatively low fusion point, leaves much to be desired since the electrical resistance properties are poor and over a period of time in contact with moisture the alkali silicate materials disintegrate completely.

One object of the present invention is, therefore, to provide a mica product in which the mica splittings are bound into a composite product which will withstand temperatures up to the disintegration temperature of the mica and will be substantially unaffected by contact with moisture.

Another object of the invention is to provide a composite product comprising superposed layers of mica splittings in which mica splittings and superposed layers are bound together by a film of an inorganic binder, which film forms a strong bond between the mica laminae and the superposed layers, is relatively flexible, is substantially insoluble, and will withstand temperatures higher than the disintegration temperature of a good grade of mica.

A further object of the invention is to provide a built-up mica plate or product possessing good electrical properties which will remain substantially constant even in the presence of high humidity.

Still another object of the invention is to provide a built-up mica plate which can be readily sawed, punched, or sheared with conventional tools.

Other objects, including the provision of novel methods by which the mica product of the desirable properties described can be obtained, will be apparent from a consideration of the specification and the claims.

In accordance with the present invention, the mica splittings of the built-up mica product are bound together by the fused reaction product of an alkali metal silicate and an alkali metal aluminate, the alkali metal being selected from the group consisting of sodium and potassium, and a compound selected from the group consisting of borax glass and boric acid. The splittings may be any type of mica, for example, Muscovite or phlogopite mica splittings.

In the preferred embodiment, the binder for the mica splittings is a fused reaction product of an alkali metal silicate and an alkali metal aluminate, the alkali metal being selected from the group consisting of sodium and potassium, in which reaction product both sodium and potassium are present; for example, the fused reaction product of sodium silicate and potassium aluminate or of potassium silicate and sodium aluminate. Due to the availability, however, of sodium silicate and potassium aluminate, a fused reaction product of these two materials is advantageously employed. If desired, however, only one alkali metal may be present in the fused reaction product for the mica splittings, in which case the product may be a fused reaction product of sodium silicate and sodium aluminate or of potassium silicate and potassium aluminate.

While various built-up mica products may be made by the use of the novel binding material and various methods may be employed, as long as a fused reaction product is obtained, the invention will be described with specific reference to the production of built-up mica plates.

In preparing the preferred type of product, the individual mica splittings are assembled in the usual manner to form single sheets or plates and an aqueous solution of the binder for the mica splittings is brought into contact with the assembled mica splittings by any suitable means, the solution being sufficiently dilute so that it may be readily applied to the splittings. The single sheets or plates are dried to remove at least a portion of the water. The single sheets are then superposed to provide the desired thickness of product with an aqueous solution of the binder and borax glass or boric acid applied therebetween. The water is then removed from the superposed plates and the plates are heated under pressure to obtain the fused reaction product of the alkali metal silicate and the alkali metal aluminate as a binder for the mica splittings and to obtain the fused reaction product of the borax glass or boric acid and the alkali metal silicate and alkali metal aluminate as a binder for the single plates.

In another embodiment, the mica splittings are dusted with either powdered borax glass or boric acid before the splittings are laid into sheets. The liquid binder is then applied to the laid-up sheet of mica splittings and the single sheets preliminarily dried and superposed. If desired, an additional amount of borax glass or boric acid may be applied between the single sheets. In still another embodiment, the mica splittings are brought into contact with a mixture of the binder solution and the borax glass or boric acid and the single mica plates formed and preliminarily dried and superposed as described above in connection with the formation of single plates by the preferred procedure. In this case also, an additional amount of borax glass or boric acid may be applied between the single plates. When a mixture of borax glass or boric acid and the binder solution is employed, the mixture must be used relatively soon after its preparation and before a gel is formed. In these last two embodiments, the water is removed from the superposed sheets and the superposed sheets are heated under pressure to obtain a fused reaction product between the alkali metal silicate, the alkali metal aluminate, and the borax glass or boric acid.

The amount of the binder material present in the finished product may vary over a wide range and will be employed in an amount, in any particular case, to provide the desired binding effects; for example, the finished product may contain from about 15% to 30% or more of the fused reaction product of the alkali metal silicate and alkali metal aluminate, including the portion thereof which is also reacted with borax glass or boric acid and the borax glass or boric acid may be used in an amount between about 5% to 15% or more, based on the weight of the mica product. Preferably, borax glass is employed and this is the substantially anhydrous product obtained by fusing borax. The borax glass or boric acid is advantageously used in finely divided form.

In the copending application Serial No. 659,672, filed April 4, 1946, by Alfred Eric Parkinson, there is described and claimed a built-up mica product comprising mica splittings bound together by the fused reaction product which is employed to bind the mica splittings of the present invention. That application also describes and claims a built-up mica plate comprising a plurality of superposed single plates of mica splittings, the individual mica splittings and the single plates being bound together by a fused reaction product of an alkali metal silicate and an alkali metal aluminate. The application, in addition, describes and claims methods for producing the products.

In accordance with the present invention, the layers or single plates comprising the mica splittings or alternatively the mica splittings themselves are not bound together merely by the reaction product of the alkali metal silicate and the alkali metal aluminate but rather by the fused reaction product of borax glass or boric acid and the alkali metal silicate and the alkali metal aluminate. It has been found that the use of the borax glass or boric acid serves as a fluxing agent to lower the fusion point of the binder to some extent and provides a laminated product which has a greater flexural strength, and is denser and slightly more rigid than a product in which the borax glass or boric acid is not employed. In addition, the borax glass, or boric acid, provides a path for escaping steam or water vapor when the laminated sheets are dried. All of the advantageous properties of the product described in the said co-pending application are retained so that the mica product of the invention is characterized by desirable properties including unusual resistance to heat and moisture.

The aqueous solution of the binder material comprises sodium and/or potassium ions, referred to herein as alkali metal ions, aluminate ions, silicate ions, and hydroxyl ions. In addition, the solution may, and usually will, contain other ions, for example the anions furnished by the compounds added to provide the ions referred to above. The presence of other ions, in addition to the ions furnishing the alkali metal silicate and alkali metal aluminate is not disadvantageous provided that they do not interfere with the production of a fused reaction product of the alkali metal silicate and alkali metal aluminate, and the compounds resulting from the presence of such other ions in the binder solution may be chemically or physically in the fused binder material.

The silicate ions are provided by the addition of a soluble alkali metal silicate. The aluminate ions are provided by the addition of an alkali metal aluminate. The aluminate may be an alkali metal aluminate obtainable on the market or it may be formed by any suitable procedure, for example by the addition of an alkali metal hydroxide to freshly prepared aluminum hydroxide or to a solution of an aluminum salt, such as aluminum sulphate, potassium aluminum sulphate or aluminum chloride. The hydroxyl ions are furnished in part by the hydroxide used to prepare the alkali metal aluminate, an excess of said hydroxide being used, and in part by the alkaline metal silicate solution, or they may be furnished entirely by the alkali metal silicate solution if it is relatively high in alkalinity. From the above, it will be apparent that the alkali metal ions may be introduced from a number of sources, namely by the alkali metal silicate, by the aluminate solution and/or by the added alkali metal hydroxide.

In the preferred embodiment of the invention, the solution of the binder material is prepared by the use of sodium silicate solution, potassium aluminum sulphate (alum), potassium hydroxide, and water so that the solution contains sodium ions, potassium ions, silicate ions, aluminate ions, hydroxyl ions, and sulphate ions. In preparing the solution, it is advantageous to dissolve the alum and potassium hydroxide in separate portions of water, and then to add the potassium hydroxide solution to the alum solution. The potassium hydroxide is present in sufficient excess so that the aluminum hydroxide first precipitated is completely dissolved to form potassium aluminate, and this excess of hydroxide and any excess of Na₂O associated with the sodium silicate provide the necessary hydroxyl ions. After the formation of the aluminate solution, the sodium silicate is added rapidly to the aluminate solution, and advantageously up to about 40% of the silicate solution is added at one time to the aluminate solution to prevent formation of a gel. As an alternative to the above, potassium silicate and a solution containing sodium aluminate may be used to form the binder solution. Instead of the preferred procedure of adding the silicate solution to the aluminate solution, the aluminate solution may be added to the silicate solution, if desired.

Any soluble alkali metal silicate may be employed, either in solution or in solid form (after dissolution) and, therefore, the ratio of alkali metal oxide to silicon dioxide in the silicate may vary over a wide range. Examples of the sodium silicates which may be used are those which have the following approximate ratios of $Na_2O$ to $SiO_2$: 1 to 3.90; 1 to 3.30; 1 to 3.22; 1 to 2.40; 1 to 2.00; and 1 to 1.60. In place of using a silicate of this type where the $SiO_2$ content exceeds the $Na_2O$ content, an alkali metal silicate in which the $Na_2O$ content exceeds the $SiO_2$ content, may be used, if desired. Preferably, however, a silicate having a larger content of $SiO_2$ than of $Na_2O$ and having a relatively low softening or fusion point will be employed and very satisfactory results are obtained when the "U-Brand" product of the Philadelphia Quartz Company with an approximate ratio of $Na_2O$ to $SiO_2$ of 1 to 2.4 is employed.

The fusion point of the binder material may be controlled by varying the proportion of the alkali metal silicate and the alkali metal aluminate present in the binder solution and the ingredients are selected so that the binder will fuse when heated to a temperature between about 1200° F. and about 2000° F. In general, the ratio of alkali metal silicate ($X_2O \cdot SiO_2$ where X represents the alkali metal) to the alkali metal aluminate ($X_2O \cdot Al_2O_3$ where X represents the alkali metal) may be varied from about 100 to 1 to about 20 to 1, for example, the ratio may be about 37 to 1. While the particular melting point of the compound will depend on whether the alkali metal content is only sodium or is only potassium or is made up of both metals, the aforesaid ratios given apply to the various compositions. Since the alkali in addition to that associated with the alkali metal silicate is present in amounts merely to insure that the aluminate will remain in solution, the amount is advantageously not greatly in excess of the amount required for that purpose.

In an illustrative case, when the binder comprises the fused reaction product of "U-Brand" sodium silicate and potassium aluminate, the preferred ratio of the compounds is about 37 to 1 and the ratio of $Na_2O$ to $K_2O$ to $SiO_2$ to $Al_2O_3$ will, therefore, be about 23 to 1 to 55 to 1. In the case when the product is the fused reaction product of a similar potassium silicate and sodium aluminate, the preferred ratio of the two compounds is about 51 to 1 and the ratio of $Na_2O$ to $K_2O$ to $SiO_2$ to $Al_2O_3$ will, therefore, be about 1 to 53 to 83 to 1.6. When the binder is the fused reaction product of sodium silicate and sodium aluminate, the preferred ratio of the two compounds is about 45 to 1 and hence the ratio of $Na_2O$ to $SiO_2$ to $Al_2O_3$ will be about 22 to 51 to 1, and when potassium silicate and potassium aluminate are used, the preferred ratio of the two compounds is about 43 to 1 and hence the ratio of $K_2O$ to $SiO_2$ to $Al_2O_3$ is about 33 to 51 to 1.

In a typical example in the preparation of a binder material containing $Na_2O \cdot SiO_2$ and $K_2O \cdot Al_2O_3$ in a ratio of about 37 to 1, the following chemicals are employed:

Sodium silicate ("U-Brand")
  cubic centimeters__ 222
Potassium aluminum sulphate_____grams__ 19
  $Al_2(SO_4)_3 \cdot K_2SO_4 \cdot 24H_2O$
Potassium hydroxide_____do____ 14
Water _____cubic centimeters__ 190

In another example of a binder material containing $Na_2O \cdot SiO_2$ and $K_2O \cdot Al_2O_3$ in a ratio of about 87 to 1, the following chemicals are employed:

Sodium silicate ("U-Brand")
  cubic centimeters__ 245
Potassium aluminum sulphate_____grams__ 9
  $Al_2(SO_4)_3 \cdot K_2SO_4 \cdot 24H_2O$
Potassium hydroxide_____do____ 6
Water _____cubic centimeters__ 90

The "U-Brand" sodium silicate has a total solids content of 46.9%, a Baumé of 52°, a specific gravity of 1.56, and contains 13.8% $Na_2O$ and 33.1% $SiO_2$. The alum and potassium hydroxide are dissolved in separate portions of the water, the potassium hydroxide solution is added to the alum solution and the sodium silicate solution is then preferably added thereto rapidly.

While the invention is not to be limited to any particular theory of the reaction, the indications are that the binder solution is not merely a mixture of compounds but contains definite compounds in solution and that during fusion a mixture of insoluble sodium and potassium aluminum silicates or an insoluble sodium or potassium aluminum silicate is formed. The fused compound may be an ortho aluminum silicate or a meta aluminum silicate or a mixture of the ortho and meta compounds. The borax glass or boric acid, as stated, is a flux for the alkali metal silicate and alkali metal aluminate and during the process, a reaction product between the borax glass or boric acid and the alkali metal silicate and alkali metal aluminate is formed.

While, as stated, mica products of various shapes may be made by the use of the novel binding materials and various methods may be employed, so long as the binder materials, together with the borax glass or boric acid, are fused during the manufacture of the product, the invention will be described with specific reference to the production of a laminated mica plate, in accordance with the preferred embodiment in which the borax glass or boric acid is applied between single plates composed of mica splittings bound by the binder. It is to be understood, however, that the same general procedure may be followed in the embodiment where the mica splittings are dusted with the borax glass or boric acid before the binder is applied and the splittings formed into a single plate and where a mixture of the binder solution and the borax glass or boric acid is used in forming the single plates.

In a typical case, single mica plates are prepared by the usual well-known process except that it is not necessary to remove all the solvent (water). For example, the mica splittings are laid in the usual manner and the binder solution, for example a binder material containing $Na_2O \cdot SiO_2$ and $K_2O \cdot Al_2O_3$ in a ratio of about 37 to 1 prepared as above described and diluted with about an equal amount of water, is sprinkled, sprayed, or brushed on or otherwise applied to the mica splittings. The water is partially or entirely removed and the plates are then cut to the requisite size. The desired thickness of plate is obtained by laminating two or more of the single plates together with an additional amount of the binder solution and borax glass or boric acid applied therebetween. The binder solution and borax glass or boric acid, either separately or in admixture, may be applied between the superposed sheets by any suitable procedure. If the binder and borax glass or boric acid are mixed, the mixture may remain usable for only a short time, for example, 20 to 30 minutes. Preferably, the aqueous binder solution is applied as a coating to one or both of the surfaces of the single plates which are to be brought into contact with other single plates and the borax glass or boric acid is uniformly sprinkled over the surface to which the binder solution has been applied. For example, the stack of superposed sheets may easily be prepared for subsequent treatment by coating the upper surface of each single plate, before another single plate is superposed thereon, with the aqueous solution and the borax glass or boric acid.

The assembled plate is dried between 1 inch mesh wire screens in an oven for 12 to 15 hours at 85° C. to 100° C. After this drying, the sheets may be cut or sawed in two, if desired, since this operation breaks the "seal" formed on the edges by the water evaporating from the binder, thus facilitating the escape of water in the subsequent heating step. The sheets are then placed between 16 gauge metal pans and dried in an oven for 9 to 10 hours at a temperature of 500° F. to 700° F. After this drying operation, several plates are placed in a steel clamp and subjected to 250 to 1000 pounds per square inch pressure in a hydraulic press in order to tighten the clamp to maintain the pressure. The tightened clamp containing the mica sheets is then placed in a muffle furnace and heated from 2 to 4 hours at 1300° F. to 1500° F. to fuse the binder. The hot clamp is removed from the furnace and placed in a hydraulic press and subjected to pressure of about 150 to about 800 pounds per square inch until the mass is cool. In order to prevent sticking of the laminated built-up mica plates to one another, and to prevent the binder from coming into contact with the screens or metal pressing plate, mica splittings or powdered mica may be sprinkled on the surfaces. As stated, the finished plate may contain from about 15% to 30% or more of the fused binder and from 5% to 15% (preferably 8% to 12%) or more of borax glass or boric acid may be used in the preparation of the product. The product will, therefore, usually contain from about 60% to about 80% of mica.

The laminated mica products of the invention have exceptionally high dielectric strength, high insulating value, and excellent heat resistant properties. Furthermore, these properties are not subject to substantial change due to conditions encountered during the normal use of material. The products can, therefore, be used successfully under humid atmospheric conditions.

The products due to their advantageous properties are available for a wide variety of uses in the industries and can be utilized wherever products made of mica alone are applicable for use. The use of the built-up mica product of the invention as heater plates in electric irons, toasters, waffle irons, and the like and in the winding of the heating element wires in electric furnace individual heaters are instances of the utility of the product.

Considerable modification is possible in the ratio of the alkali metal silicate to aluminate employed in the binder material as well as in the methods used in producing the built-up mica product, without departing from the essential features of the invention.

I claim:
1. A built-up mica product comprising mica splittings bound together by the water-insoluble product of the fusion of a water-soluble reaction product of a water-soluble alkali metal silicate and of a water-soluble alkali metal aluminate, the alkali metal being selected from the group consisting of sodium and potassium, and of a compound selected from the group consisting of borax glass and boric acid.

2. The product of claim 1 wherein the ratio of alkali metal silicate to the alkali metal aluminate in the fused reaction product is between about 100 to 1 and about 20 to 1 and wherein the compound selected from the group consisting of borax glass and boric acid is borax glass.

3. A laminated mica product comprising a plurality of layers of mica splittings, the said mica splittings and the said layers being bound together by the water-insoluble product of the fusion of a water-soluble reaction product of a water-soluble alkali metal silicate and of a water-soluble alkali metal aluminate, the alkali metal being selected from the group consisting of sodium and potassium, and of a compound selected from the group consisting of borax glass and boric acid.

4. The product of claim 3 wherein the ratio of alkali metal silicate to the alkali metal aluminate in the fused reaction product is between about 100 to 1 and about 20 to 1 and wherein the compound selected from the group consisting of borax glass and boric acid is borax glass.

5. A laminated mica product comprising a plurality of layers of mica splittings, the said mica splittings being bound together by the water-insoluble product of the fusion of a water-soluble reaction product of a water-soluble alkali metal silicate and a water-soluble alkali metal aluminate, the alkali metal being selected from the group consisting of sodium and potassium, and the layers of mica splittings being bound together by the water-insoluble product of the fusion of a water-soluble reaction product of a compound selected from the group consisting of borax glass and boric acid and the water-soluble alkali metal silicate and alkali metal aluminate.

6. The product of claim 5 wherein the ratio of alkali metal silicate to the alkali metal aluminate in the fused reaction product is between about 100 to 1 and about 20 to 1 and wherein the compound selected from the group consisting of borax glass and boric acid is borax glass.

7. A laminated mica product comprising a plurality of layers of mica splittings, the said mica splittings being bound together by the water-insoluble product of the fusion of a water-soluble reaction product of a water-soluble alkali metal silicate and a water-soluble alkali metal aluminate, the alkali metal being selected from the group consisting of sodium and potassium, in which reaction product both sodium and potassium are present, and the layers of mica splittings being bound together by the water-insoluble product of the fusion of a water-soluble reaction product of borax glass and the said alkali metal silicate and alkali metal aluminate.

8. The product of claim 7 wherein the ratio of alkali metal silicate to the alkali metal aluminate in the fused reaction product is between about 100 to 1 and about 20 to 1.

9. A laminated mica product comprising a plurality of layers of mica splittings, the said mica splittings being bound together by the water-insoluble product of the fusion of a water-soluble reaction product of sodium silicate and potassium aluminate, and the layers of mica splittings being bound together by the water-insoluble product of the fusion of a water-soluble reaction product of borax glass and sodium silicate and potassium aluminate.

10. The product of claim 9 wherein the ratio of sodium silicate to potassium aluminate in the fused reaction products is between about 100 to 1 and 20 to 1.

11. The product of claim 9 wherein the ratio of sodium silicate to potassium aluminate in the fused reaction products is about 37 to 1.

12. The steps in the process of making a built-up mica product which comprises preliminarily binding mica splittings in the form of a built-up product by an aqueous solution comprising silicate, aluminate, and hydroxyl ions and alkali metal ions selected from the group consisting of sodium and potassium and a compound selected from the group consisting of borax glass and boric acid, and heating said product under pressure to obtain the water-insoluble product of the fusion of a water-soluble reaction product of a water-soluble alkali metal silicate and a water-soluble alkali metal aluminate and borax glass or boric acid as the permanent binder for said mica splittings.

13. The process of claim 12 wherein the ratio of sodium silicate to potassium aluminate in the fused reaction products is between about 100 to 1 and 20 to 1.

14. The process of claim 12 wherein the ratio of sodium silicate to potassium aluminate in the fused reaction products is about 37 to 1.

15. The steps in the process of making a laminated mica product which comprises laying mica splittings to form a single plate, applying thereto an aqueous solution comprising silicate, aluminate and hydroxyl ions and alkali metal ions selected from the group consisting of sodium and potassium, drying said plate to remove at least a portion of the water, superposing a plurality of said single plates with an aqueous solution containing the ions above recited and a compound selected from the group consisting of borax glass and boric acid applied therebetween, removing the water from said superposed plates and heating said superposed plates to obtain the water-insoluble product of the fusion of a water-soluble reaction product of a water-soluble alkali metal silicate and a water-soluble alkali metal aluminate as the binder for said mica splittings and to obtain the water-insoluble product of the fusion of a water-soluble reaction product of borax glass or boric acid and a water-soluble alkali metal silicate and a water-soluble alkali metal aluminate as a binder for said single plate.

16. The process of claim 15 wherein the solution contains both sodium and potassium ions and wherein the compound selected from the group consisting of borax glass and boric acid is borax glass.

17. The process of claim 15 wherein the solution contains both sodium and potassium ions and wherein sodium ions are provided by sodium silicate and potassium ions are provided by potassium aluminate and wherein the compound selected from the group consisting of borax glass and boric acid is borax glass.

18. The product of claim 1 wherein the ratio of alkali metal silicate to the alkali metal aluminate in the fused reaction product is between about 100 to 1 and about 20 to 1 and wherein the compound selected from the group consisting of borax glass and boric acid is boric acid.

19. The product of claim 3 wherein the ratio of alkali metal silicate to alkali metal aluminate in the fused reaction product is between about 100 to 1 and about 20 to 1 and wherein the compound selected from the group consisting of borax glass and boric acid is boric acid.

20. The product of claim 5 wherein the ratio of alkali metal silicate to alkali metal aluminate in the fused reaction product is between about 100 to 1 and about 20 to 1 and wherein the compound selected from the group consisting of borax glass and boric acid is boric acid.

RANDALL HURON SHEPARD.

REFERENCES CITED

The following references are of record in the file of this patent:

UNITED STATES PATENTS

| Number | Name | Date |
| --- | --- | --- |
| 1,578,812 | Dawes | Mar. 30, 1926 |
| 1,707,277 | Okuri | Apr. 2, 1929 |
| 1,975,078 | Broughton | Oct. 2, 1934 |
| 2,231,718 | Hill | Feb. 11, 1941 |
| 2,378,927 | Jewett | June 26, 1945 |